(12) United States Patent
Csakurda

(10) Patent No.: US 12,737,286 B2
(45) Date of Patent: Sep. 15, 2026

(54) INTERLEAVED MEMORY TRANSACTION TRACKING FOR TRANSACTIONS WITH UNRELATED LENGTHS

(71) Applicant: Arm Limited, Cambridge (GB)

(72) Inventor: Edit Csakurda, Budapest (HU)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 19/059,031

(22) Filed: Feb. 20, 2025

(65) Prior Publication Data

US 2025/0298735 A1 Sep. 25, 2025

(30) Foreign Application Priority Data

Mar. 20, 2024 (GB) ...................................... 2403988

(51) Int. Cl.
*G06F 12/02* (2006.01)

(52) U.S. Cl.
CPC ................................ *G06F 12/0223* (2013.01)

(58) Field of Classification Search
CPC .. G06F 12/0223; G06F 7/76; G06F 2212/401; G06F 12/023; G06F 12/02
See application file for complete search history.

(56) References Cited

U.S. PATENT DOCUMENTS 8,688,941 B2 * 4/2014 Arakawa ............... G06F 3/0665 711/206
9,823,854 B2 11/2017 Valenzuela et al.
10,068,309 B2 9/2018 Fries et al.
2003/0159011 A1 * 8/2003 Unno .................... G06F 3/0617 714/E11.12
2005/0069169 A1 3/2005 Zarrabizadeh
2019/0124395 A1 * 4/2019 Lin .................... H04N 21/4331

OTHER PUBLICATIONS

Patent Acts 1977: Search Report under Section 17, App. No. GB2403988.5, Mailed Nov. 18, 2024, 4 pages.

* cited by examiner

*Primary Examiner* — Jae U Yu
(74) *Attorney, Agent, or Firm* — Berkeley Law & Technology Group, LLP

(57) ABSTRACT

A first series of memory access transactions are received from a first set of compressed data having a number of first transactions indeterminate in a transaction receiver, and a second series of memory access transactions are received from a second set of compressed data having a number of second transactions indeterminate in the transaction receiver. A count of outstanding transactions for the combined first and second sets of compressed data is received in the transaction receiver, and memory space is allocated for the first and second series of transactions based at least in part on the received count of outstanding combined transactions. The first series of transactions are stored sequentially from a first end of the allocated memory space and the second series of transactions are stored sequentially from a second end of the allocated memory space opposite the first end.

20 Claims, 6 Drawing Sheets

400

| CODING UNIT SIZE (BYTES) | NUMBER OF CODING UNITS | CODING UNIT ELEMENT SIZES | MAX NUMNBER OF READS |
|---|---|---|---|
| 64 BYTES | 2 CU | 64 BYTES | 2 |
| 128 BYTES | 4 CU | 128 BYTES | 4 |
| 192 BYTES | 4 CU | 128, 64 BYTES | 8 |
| 224, 256 BYTES | 4 CU | 256 BYTES | 4 |
| 320 BYTES | 2 CU | 256, 64 BYTES | 4 |
| 384 BYTES | 2 CU | 256,128 BYTES | 4 |
| 512 BYTES | 2 CU | 256, 256 BYTES | 4 |
| 640 BYTES | 1 CU | 128, 256, 256 BYTES | 3 |
| 768 BYTES | 1 CU | 256, 256, 256 BYTES | 3 |
| 896, 1024 BYTES | 1 CU | 256, 256, 256, 256 BYTES | 4 |

FIG. 4

INTERLEAVED MEMORY TRANSACTION TRACKING FOR TRANSACTIONS WITH UNRELATED LENGTHS

This application claims the benefit of priority to UK Patent No. 2403988.5, titled "INTERLEAVED MEMORY TRANSACTION TRACKING FOR TRANSACTIONS WITH UNRELATED LENGTHS," filed on Mar. 20, 2024, and incorporated herein by reference in its entirety.

FIELD

The field relates generally to memory transactions, and more specifically to memory transaction tracking for transactions with unrelated length in a memory system.

BACKGROUND

Computers store information in a variety of ways, including magnetic disk storage that has high capacity and retains its data after power is no longer supplied, nonvolatile semiconductor memory such as flash memory that similarly retains its state when power is disconnected, and volatile memory such as Static Random Access Memory (SRAM) and Dynamic Random Access Memory (DRAM) that operate more quickly but that do not retain their data states when power is removed. SRAM uses semiconductor devices such as transistors to store data, while DRAM typically uses a small capacitor to store data state and must be "refreshed" or rewritten every few seconds or it may lose its data state. Although SRAM bitcell structures are typically larger than DRAM bitcell structures, they operate faster and are therefore preferred for applications such as cache and for internal registers of a CPU. Slower but cheaper DRAM is commonly used for a computer's main memory, where capacity is the primary concern.

SRAM typically comprises a bitcell array of memory cell or bitcell structures that are each operable to store a bit (e.g., a one or zero value) of information, along with peripheral circuitry such as address decoders and circuitry operable to write or erase the contents of bitcells in the bitcell array. In some examples, the bitcell memory cell structures may be addressable via peripheral circuitry as words, where each word comprises a number of bits such as eight bits, 16 bits, 32, bits, or 64 bits that represent a single unit of data that is handled by the processor. A typical modern processor may have a number of registers used during execution of program instructions to store instruction operands and results, each of which may be formed using SRAM or a similar memory structure. Similarly, frequently-used data may be stored in a cache local to the processor, which may typically contain tens of thousands or hundreds of thousands (or more) of words of data per core in the processor. Local cache made of SRAM bitcell arrays makes retrieval of this often-used data faster than if the same data was retrieved from main memory (or DRAM), which is typically slower and not stored local to the processor.

SRAM may also be used in a processor or computer system to store data being actively processed, such as image data being rendered for display. Such image data is often compressed to reduce power consumption and to reduce bandwidth of handling the data within the computer system, which also reduces the amount of memory such as SRAM that is used to store the image data. Frames of image data may be stored or referenced in a variety of formats, including spatial image coordinates, block-based compressed addressing, and other schemes that may ha different image element lengths, varying image element lengths, or other characteristics that cause the image data handled within the computer system to vary in format and/or size.

For reasons such as these, a need exists for management of compressed data in varying sizes and/or formats when handling such data, such as storing such compressed image data in SRAM bitcell or other memory arrays.

BRIEF DESCRIPTION OF THE DRAWINGS

The claims provided in this application are not limited by the examples provided in the specification or drawings, but their organization and/or method of operation, together with features, and/or advantages may be best understood by reference to the examples provided in the following detailed description and in the drawings, in which:

FIG. 4 is a chart showing the use of coding units to store compressed data, consistent with an example embodiment.

Figure 1:
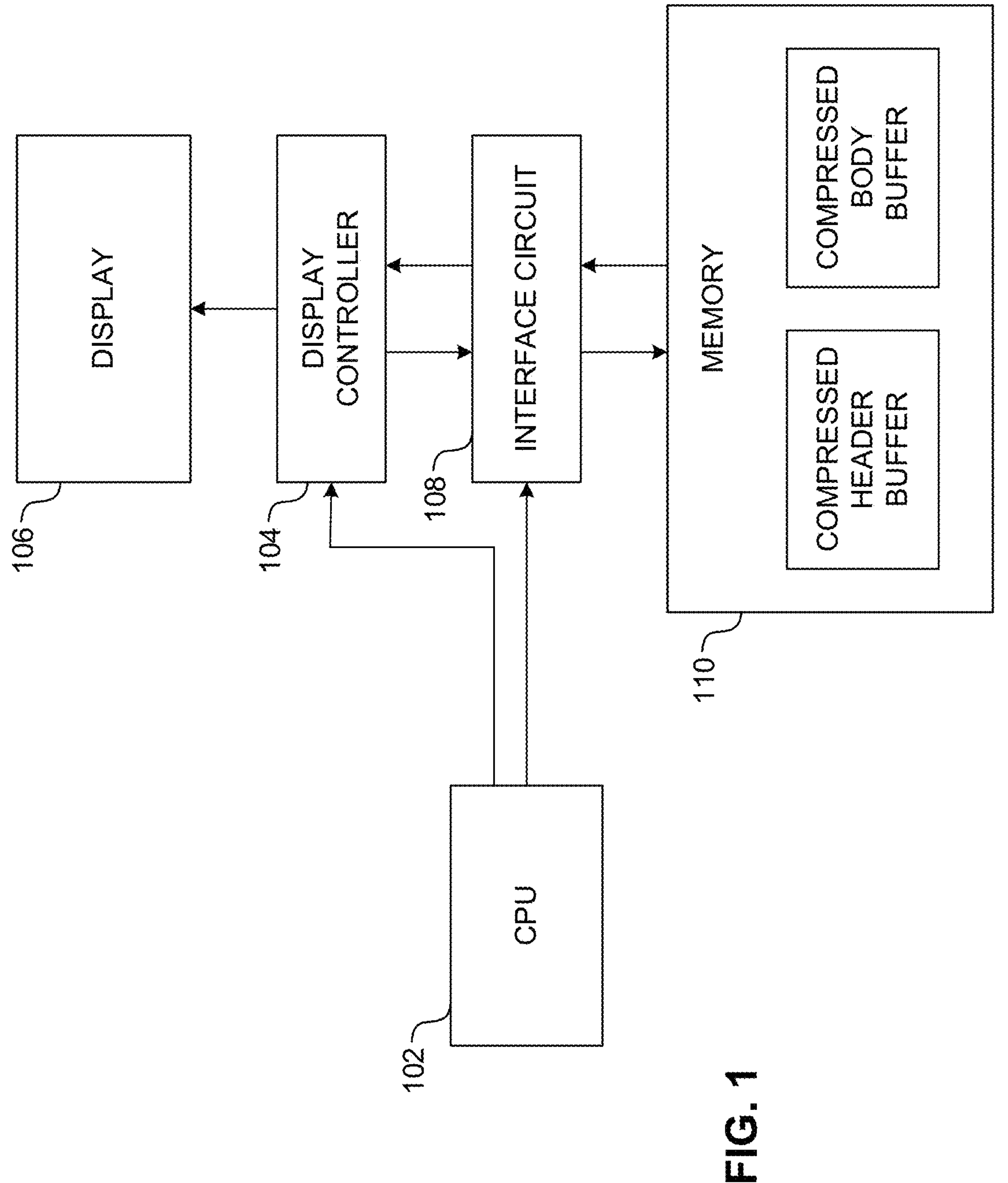
FIG. 1 is a block diagram of a computerized system, consistent with an example embodiment.

Reference is made in the following detailed description to accompanying drawings, which form a part hereof, wherein like numerals may designate like parts throughout that are corresponding and/or analogous. The figures have not necessarily been drawn to scale, such as for simplicity and/or clarity of illustration. For example, dimensions of some aspects may be exaggerated relative to others. Other embodiments may be utilized, and structural and/or other changes may be made without departing from what is claimed. Directions and/or references, for example, such as up, down, top, bottom, and so on, may be used to facilitate discussion of drawings and are not intended to restrict application of claimed subject matter. The following detailed description therefore does not limit the claimed subject matter and/or equivalents.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to aid in understanding these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

Data storage in computerized systems typically includes nonvolatile storage such as magnetic disk storage or flash memory that retains data such as an operating system, installed programs, saved files, and the like when a computer is powered off as well as volatile memory that loses its contents when power is removed. Volatile memory is typically much faster at reading and writing data, and so is used to hold certain operating system components, executing programs, and other data being actively used while a computer is powered on.

Common types of memory employed in computer systems include main memory that is often comprised of Dynamic Random Access Memory (DRAM), and cache memory and registers that are often comprised of Static Random Access Memory (SRAM). DRAM is generally slower than SRAM, but takes fewer components to build per memory cell. DRAM typically stores memory in a capacitive structure that must be refreshed on the order of every few seconds to maintain its contents. SRAM typically uses a larger structure comprising several transistors such as Metal Oxide Semiconductor Field Effect Transistors (MOSFETs) to store data, but operates faster than DRAM and so is preferred for applications where speed is more important than capacity such as in cache memory or processor registers.

Memory such as SRAM or DRAM is typically built from semiconductors such as on an integrated circuit substrate as an array of bitcells that can each store a single bit of information (typically represented by a one or a zero state). The bitcells are addressable for reading or writing via peripheral circuitry that accesses the desired bitcells using a combination of bitlines and wordlines, and includes the ability to read and write addressed bitcells. Bitcells are often addressed by words rather than by individual bitcell addresses, where each word comprises a number of bits (typically a power of two ranging from eight to 64) that make up a base unit of data handled by the processor. A typical modern 64-bit processor may therefore primarily work with 64-bit words (or may address bitcells 64 bits at a time), but in various examples may also perform single-bit operations or work with other word sizes as well for certain operations. A typica modern processor may also have many registers used during execution of software instructions to hold data such as the operands and results being used for each instruction, typically on the order of tens of registers per processor core.

While the relatively slower DRAM is desirable for main memory of a computer where capacity is typically a greater concern than speed, SRAM is more typically used for processor registers and for cache memory located near the processor core (and often on the same die or substrate as the processor cores) where speed is of greater concern. Cache memory typically stores data that is also stored in main memory, but because cache typically comprises faster SRAM bitcells and is small in size relative to main memory, cache provides for faster processor access to data the processor is likely to use soon. A typical modern computer may have multiple levels of cache (e.g., L1, L2, L3, etc.), because smaller caches have lower latency or higher speed but are less likely to contain the desired data than a larger cache.

High speed memory such as SRAM may also be used to store groups or sets of data that are being actively used in processing tasks, such as rendered image data, artificial intelligence model data, and the like. Image data, for example, may be processed as sequential image frames in some examples, and may be derived from one or more prior image frames such as where ray tracing or other image rendering methods make use of prior frame image data in rendering a current image frame. Rendering and displaying such images or sequences of images may be among the most computationally intensive tasks performed in a modern processor or graphics processing unit, and fast and efficient handling of such data may have a significant impact on the overall performance of the computerized system.

In one such example, image data may be compressed within the processor or the computer. Compressing the image may reduce the amount of bandwidth needed to transfer images, reduce the power used to process and handle the images, and reduce the amount of memory such as relatively large and expensive SRAM memory cells used to store the images. Image storage or compression schemes include spatial coordinate system storage of pixel data of the images, block-based coordinate storage of image data, and other image compression formats that may vary in overall size, length per element of image data, and the like. This variation in image formats and image element sizes within a compressed format may present a variety of challenges in efficiently handling such image data, such as where the size of image elements such as compressed image blocks may vary or may not be known in advance. For example, display system within a processor or computer system may receive rendered image data having unknown length such as compressed image data and need to store it quickly and efficiently. This becomes complex to do when multiple streams of data may be received interleaved with one another, such as different blocks or elements of a compressed rendered image or elements of different rendered images that may be compressed or otherwise have unknown lengths.

Some examples presented herein may therefore provide for allocating memory space for transactions comprising interleaved data from different data series such as different image blocks. Some such schemes may further provide for efficient tracking of the image location or other location in a sequence of the received data, even when such data is interleaved with data from another data series such as a different image block, image, or compressed image element.

In one such example, a first series of memory access transactions from a first series of compressed data having a number of first transactions indeterminate in a transaction receiver may be received, along with a second series of memory access transactions from a second set of compressed data having a number of second transactions indeterminate in the transaction receiver. A count of outstanding transactions for the combined first and second sets of compressed data may also be received. First memory space may be allocated for the first and second series of transactions based at least in part on the received number of outstanding transactions for the combined first and second sets of compressed data such that the first series of transactions are stored sequentially from a first end of the allocated memory space and the second series of transactions are stored sequentially from a second end of the allocated memory space opposite the first end. In a further example, the first series of transaction stored sequentially from the first end are stored using consecutive memory transaction addresses counting in a first direction and the second series of transactions stored sequentially from the second end of the allocated first memory space are stored using consecutive memory transaction addresses counting opposite the first direction.

In further examples, additional series of memory access transactions such as a third and fourth series of memory access transactions may similarly be received, along with a count of outstanding transactions for the combined third and fourth sets of transactions. A second or additional memory space may be allocated for the third and fourth series of transactions based at least in part on the received number of outstanding transactions for the combined third and fourth sets of compressed data, such that the third series of transactions are stored sequentially from a first end of the allocated second memory space and the fourth series of transactions are stored sequentially from a second end of the allocated second memory space opposite the first end.

The memory transactions may be received in a device such as a display controller, a memory controller, an interface circuit, or other element within a processor in some examples. In other examples, the memory transactions may be received in a device external to a processor such as a graphics card or display card, a bus or network interface, or the like. Although the memory transactions in some examples may comprise compressed image data, they may comprise other data in other examples, such as other compressed data, AI-generated data, or other such data having unknown length that may be interleaved.

Examples such as these may efficiently store such interleaved data by allocating memory locations based on known lengths of combined series of memory transactions, and may save bandwidth and memory register space by avoiding transmitting the length of each series of memory transactions to a receiver. This may result in more efficient use of memory, use of fewer registers in the receiver to track the memory locations of received memory transactions, and reduced power consumption due to more efficient handling of such data. In some examples, the received data may comprise image data that may be compressed on one of two or more different formats, where the format may be selected from among the available formats to further improve memory efficiency, bandwidth efficiency, and power consumption in conveying and storing the image data.

FIG. 1 is a block diagram of a computerized system, consistent with an example embodiment. A central processing unit or CPU is shown at 102, and may be operable to execute program instructions to perform various operations as may be defined by the CPU's instruction set. The CPU is coupled to a display controller 104, which in turn is coupled to display 106. The display controller may perform operations such as displaying images, rendered image streams, video, or other such information handled within the computerized system of FIG. 1 on the display 104. The CPU 102 and display controller 104 are further coupled to an interface circuit 108, which in the example of FIG. 1 may be operable to facilitate communication between a memory 110 and the CPU and/or display controller 104. In a more detailed example, the CPU, the display controller, the interface circuit, and the memory may be a part of the same integrated circuit or "chip," such as a processor with integrated graphics capability.

In operation, the processor may control various functions performed by a graphics processing unit (GPU) or GPU manager, such as rendering image streams, playing video streams, or displaying an operating system or application interface. Some applications such as video gaming and augmented reality may comprise rendering image streams having complex moving objects, ray tracing, and other such technologies that may tax the capabilities of the computerized system, and include various techniques to reduce the amount of processing needed to render the images, reduce the amount of bandwidth and memory needed to communicate and store the images, and improve the overall performance of the computerized system. In a more detailed example, a rendered image stream generated by CPU 102 or a GPU may be conveyed for display as a compressed stream of blocks of image data using a selected compression format, comprising a series of transactions between the CPU and the interface circuit. Once an image frame is received and stored in memory 110, it may be assembled and displayed on display 106 via display controller 104.

In a commercial example, an ARM processor core may use a compression technology such as ARM Compression Technology (ACT) to send a series of transactions to interface circuit 108 to store display images, such as images from a rendered image stream or frames of a video sequence. The transactions may be sent using ARM protocols such as Advanced Extensible Interface (AXI) or ACE Coherency Extensions (ACE), some of which may provide transaction end signaling, transaction group, and other such information in transaction header data or in dedicated bus control signals. The body of each transaction may be compressed or encoded image frame data, such as using ARM Frame Buffer Compression (AFBC), ARM Frame Rate Compression (AFRC), and/or another suitable compression coding method. In a further example, the CPU may estimate or determine which of two or more available encoding methods are the most efficient for a given image frame or image frame stream, and select that encoding method for encoding image data in memory transactions sent from the CPU to interface circuit 108.

The encoded memory transactions received in interface circuit 108 are stored in memory 110, which in a more detailed example comprises storing received transactions in a compressed header buffer and compressed body buffer for each transaction until the transaction body can be stored in the correct allocated location within memory 110. Because multiple streams of transactions may be received interleaved with one another, such as when image frames comprising different images or different parts of an image may be interleaved, efficient storage of received compressed image frames in the correct memory locations may be a complex task. Factors such as minimizing the number of registers used to track transaction streams, minimizing the amount of header data that is communicated from the GPU, dedicated compression engine, or CPU to track transaction streams, and maximizing efficient use of available memory 110 may be addressed by the examples described and shown herein.

In one such example, memory transaction streams may be tracked as pairs, such that a first series of memory access transactions from a first set of compressed data having a number of first transactions and a second series of memory access transactions from a second set of compressed data having a number of second transactions are received in the interface circuit. A count of outstanding transactions for the combined first and second sets of compressed data is further received in the transaction receiver, and memory space is allocated for the first and second series of transactions based at least in part on the received number of outstanding transactions for the combined first and second sets of compressed data. In a further example, the first series of transactions are stored sequentially from a first end of the allocated memory space and the second series of transactions are stored sequentially from a second end of the allocated memory space opposite the first end. Such a transaction tracking scheme may reduce by half the number of transaction counts sent and tracking registers employed to efficiently store the transaction streams in allocated memory 110.

Figure 2:
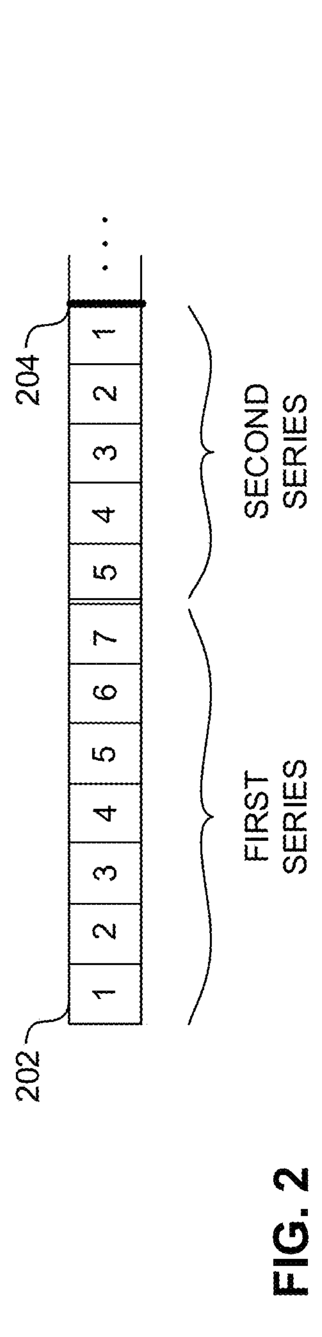
FIG. 2 is a diagram showing allocation of memory locations for interleaved series of memory transactions, consistent with an example embodiment.

FIG. 2 is a diagram showing allocation of memory locations for interleaved series of memory transactions, consistent with an example embodiment. As shown generally in the simplified example at 202, a first series of transactions comprising seven transactions and a second series of transactions comprising five transactions are being received, and the transactions from the first and second series may be interleaved with one another as received. The receiver in this example may not know the number of transactions in either the first series or second series independently, but receives the number of combined transactions for the first and second series from the sender, such as in a header of a received memory transaction or through other such means.

Because the number of combined memory transactions for the first and second series in this example is 12, twelve memory locations may be allocated as shown by the marker at 204. As the first packets from the first and second series are received, they may be stored in the memory locations sequentially counting up from a first end of the allocated memory space for the first series, and sequentially counting down from the second end 204 of the allocated memory space for the second memory series. The receiver may not know how many allocated memory spaces will be filled by each series of memory transactions, but because the total number of memory transactions for the first and second series combined is known the receiver can count the number of memory transactions received for each pair of memory transaction series to determine when all transactions in the transaction series pair have been received. In another example, a control signal (e.g. an rlast control signal) may indicate the last transaction in a transaction series and such control signals may be counted or tracked to ensure that every series is fully received. In an alternate embodiment, a combination of control signals and count of received transactions per transaction pair, or per set of transaction pairs, may be used to ensure all transactions in each transaction series have been received.

When all transactions for a transaction series have been received, the first and second series have both been received in their entirety and the interface circuit or memory controller may receive additional memory transaction series. Although FIG. 2 shows memory locations as consecutive or contiguous locations in a memory, in other examples the allocated memory locations may be mapped to different locations, or may not be contiguous.

Figure 3:
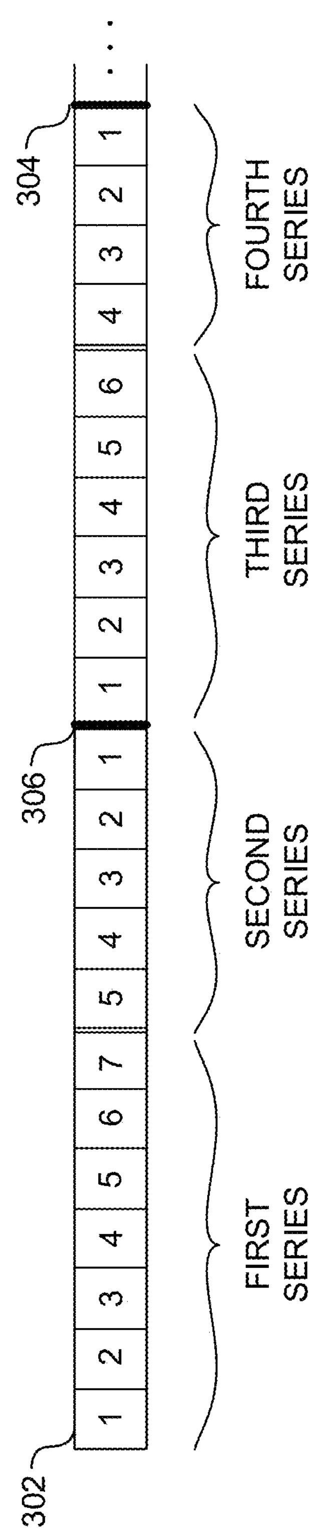
FIG. 3 shows a more complex example of allocation of memory locations for interleaved series of memory transactions, consistent with an example embodiment.

FIG. 3 shows a more complex example of allocation of memory locations for interleaved series of memory transactions, consistent with an example embodiment. Here, the receiver is receiving not only interleaved memory transactions from first and second series of memory transactions, but may further receive memory transactions from third and fourth memory transaction series interleaved with the transactions from the first and second memory transaction series. The receiver further may receive both the combined length of the first and second series of transactions and the combined length of the third and fourth series of transactions, or may receive the combined length of the first, second, third, and fourth series of transactions and the combined length of at least one pair (e.g. first and second series or third and fourth series) of transactions.

In the example of FIG. 3, the receiver may receive information that the combined length of the first and second series of transactions is twelve transactions, and the combined length of the third and fourth series of transactions is ten transactions. The receiver may alternatively receive the combined length of the first, second, third, and fourth series of transactions, and receive the combined length of at least one pair of transactions such as the first and second series of transactions or the third and fourth series of transactions. The interface circuit or memory controller may in either example determine not only the endpoint 304 for the group of four transactions (allocating 22 memory locations in total), but may set a divider 306 between the second and third transactions based on the overall transaction count of the first pair of memory transaction series and/or the overall transaction count of the second pair of memory transaction series. By setting the divider 306 between the first pair of memory transaction series and the second pair of memory transaction series, four sets of starting points and fill directions have been established—the first series may be filled sequentially from the beginning of the allocated memory space, the second series may be filled counting backward sequentially from the divider 306, the third series may be filled sequentially forward from the memory divider 306, and the fourth series may be filled backward sequentially from the end of the allocated space 304. By using additional dividers such as divider 306, allocated space may be further allocated to accommodate additional pairs of memory transaction series.

In a more detailed example, the number of bits used to track the memory transaction series further increases from one bit in the example of FIG. 2 to two bits in the example of FIG. 3, and may use three or more bits to track memory transactions when the number of memory transaction series that may be interleaved exceeds four. For each of the memory transaction series of FIG. 3, a counter may be established to track the active memory location in each memory location series, such as by counting the number of memory locations in each series that have already been filled so that the next memory transaction for each series may be stored in the desired memory location. Upon filling each allocated memory space allocated per pair of memory transactions, the counters may further be used to reflect the number of elements in each individual memory transaction series.

Methods such as those of FIGS. 2 and 3 may further be used with various addressing schemes, in environments where the memory transaction series elements may or may not arrive interleaved, and with or without additional tracking or addressing methods. In one such example, the methods of FIGS. 2 and 3 may be implemented to handle data request comprising coding units of compressed data, where each coding unit comprises a compression element having a length that is dependent on the compression ratio or effectiveness. Although FIGS. 2 and 3 show memory locations as consecutive or contiguous locations in a memory, in other examples the allocated memory locations may be mapped to different locations, or may not be contiguous.

FIG. 4 is a chart showing the use of coding units to store compressed data, consistent with an example embodiment. Here, a data record representing information such as a compressed image may be encoded using coding units that vary in length from 64 bytes up to 1024 bytes, with a data request comprising from one to four of such coding units. Each coding unit may comprise one or more coding unit elements having standardized coding unit element sizes of 64, 128, or 256 bytes. The data requests may therefore be divided into one to four coding units, which in turn may be divided into coding unit elements depending on the size of the coding units.

Each coding unit element in a coding unit may be read independently, and the number of coding units may be read independently, potentially interleaved with one another. In the first row with 64 byte coding units, for example, two coding units of 64 bytes each result in a maximum of two independent transaction streams such as is shown in the example of FIG. 2. The third row example of four coding units of 192 bytes may result in four reads of 128 and 64 byte coding unit elements, for a maximum number of reads or transaction streams of eight, as reflected in the far right column of the table. Because the compressed data in some examples may not consume all available coding units for a given data element, the number of reads are considered a maximum, and may be as little as zero in special cases where a single solid color is encoded. The example coding method shown in FIG. 4 therefore involves from zero to eight transaction series per data request, which can be handled with three dividers at most and three bits allocated to tracking the transaction stream for each received data element.

Because only one coding example in the table of FIG. 4 potentially includes more than four transaction series, use of a single divider and two transaction stream tracking bits to serve up to four transaction streams may be used to handle all other coding cases in the table. To avoid using multiple dividers for the special case having 192 bit coding units, some example embodiments may assume that the 128 bit (or alternatively the 64 bit) coding unit element size is fixed, such that only a single divider is needed to handle the four unknown length transaction series. Such a coding scheme ensures that every situation can be handled using a single divider, a three-bit transaction stream identifier, and four transaction length counters, but remains flexible and extendible for other encoding schemes that may require more extensive transaction series tracking.

Figure 5:
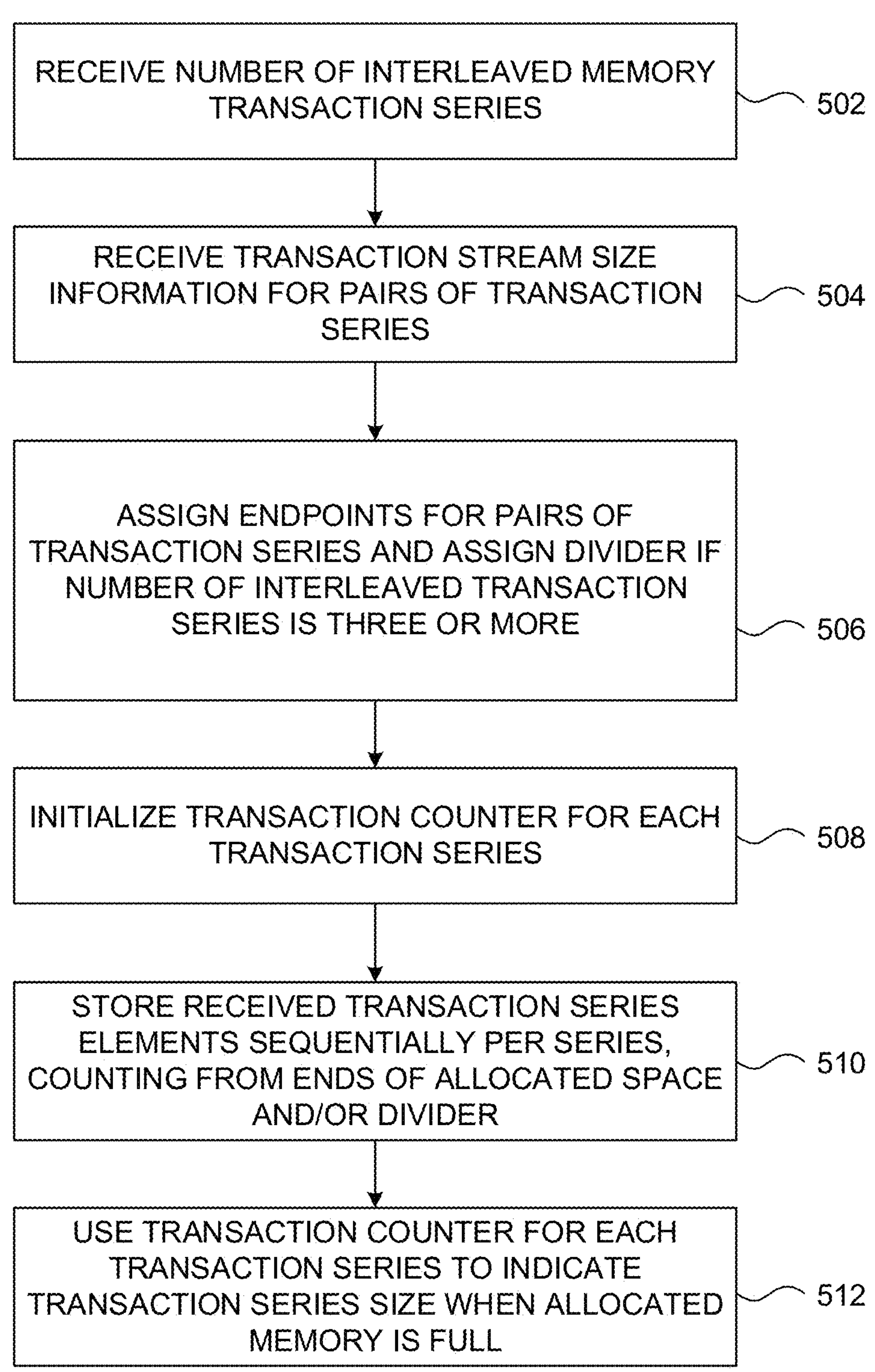
FIG. 5 is a flow diagram of a method of tracking interleaved memory transaction series, consistent with an example embodiment.

FIG. 5 is a flow diagram of a method of tracking interleaved memory transaction series, consistent with an example embodiment. At 502, a receiver such as a memory controller, interface circuit, or the like receives a request to initiate one or more memory transaction series, including the number of transaction series or streams that are to be received. A transaction series size for each pair of transaction series is further received at 504, and endpoints for pairs of transaction series are assigned based on the size of each pair of transactions. In a more detailed example, the transaction series size for each pair of transactions may also be used to assign one or more dividers at 506 if the number of interleaved transaction series is more than two. In a more detailed example, the divider comprises a memory location based on the received transaction stream size information for one or more pairs of transactions received at 504, such as in the examples of FIGS. 2 and 3. Allocated memory locations may be consecutive or contiguous locations in a memory in some examples, but in other examples the allocated memory locations may be mapped to different locations or may not be contiguous.

At 508, transaction counters are initialized for each transaction series being received, such that the transaction counter both ensures received transactions are placed in the next location in the memory space allocated for each transaction series and indicates the size of each transaction series when the allocated memory space for the interleaved memory transaction series is full. In an alternate embodiment, transaction series may be counted based on the known number of transactions in each pair and the transaction series in the transaction pair may be considered fully received when the expected count of transactions for the transaction pair has been received. Such an embodiment may be employed where allocated storage endpoints and/or divider locations may leave conscious gaps between stored transactions, as the transaction series being fully received is dependent on the number of transactions in each pair being received rather than a memory space being filled. In another example, a control signal (e.g. an rlast signal) indicating the last transaction in a series may indicate that a series is fully received, and the transaction series are all considered fully received when the expected number of transactions for the combined transaction series match the expected transaction count or a control signal for each series indicating the last transaction in the each series has been received.

The transaction series elements are received at 510, and are stored sequentially per series. Because the receiver may not know the number of transactions in each series but does know the number of transactions in each pair of transaction series, memory transaction series are stored sequentially from opposite ends of memory space allocated per transaction pair of known size. When more than one pair of memory transaction series may be received interleaved together, a divider may further be used to separate memory space allocated for one pair of memory transactions from memory space allocated for another pair of memory transactions, such as is described in the example of FIG. 3. When the memory space allocated for a transaction pair is full at 512, the memory transaction counters for the two memory transaction series in that pair may be used to indicate the number of memory transactions in each memory transaction series, such as to later retrieve, process, or otherwise manage the stored memory transaction data.

By using interleaved memory transaction tracking such as in the examples presented herein, some embodiments may reduce the amount of communication needed, the number of registers required, and the memory or storage space consumed in memory transactions that covey variable length data such as compressed image data in a computerized system. The amount of power consumed may be similarly reduced, and the speed or other overall performance of the system may be improved by employing such systems. Although the examples presented herein illustrate certain applications of such methods, such as storing compressed image data in onboard SRAM for display, they may be similarly beneficial or applicable in other applications as well.

Figure 6:
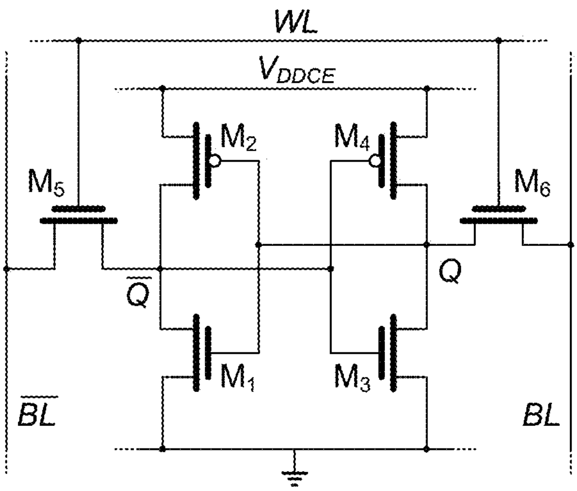
FIG. 6 is a schematic diagram of a static random access memory (SRAM) cell, consistent with an example embodiment.

FIG. 6 is a schematic diagram of a static random access memory (SRAM) cell, consistent with an example embodiment. The SRAM memory cell of FIG. 6 is often referred to as a 6T SRAM cell due to its six transistors, but other SRAM memory cell configurations exist and may also be used to form bitcell arrays such as those in the examples presented herein.

The memory cell can store a "bit" or single high or low state of information using the four transistors M1, M2, M3, and M4. These four transistors form two cross-coupled inverters, which are stable in either a high or low (i.e., a 1 or 0) state. Access transistors M5 and M6 control access to the cross-coupled inverters formed by M1, M2, M3, and M4 during read and write operations. Word lines denoted by WL and bitlines denoted by BL are used to select which memory bitcells in a bitcell array are being addressed, and use of both a bitline BL and inverse bitline $\overline{BL}$ may improve noise margins and speed of the SRAM bitcell.

In operation, the bitcell may operate in standby, reading, or writing states. In a standby state, the word line WL is not active, the access transistors M5 and M6 disconnect the cell from the bit lines, and the cross-coupled inverters formed by M1, M2, M3, and M4 reinforce each other to retain their state as long as they remain powered.

In a reading state, the word line WL is brought high, and one or both of the bitline BL and inverse bitline $\overline{BL}$ may be read to determine the state of the bitcell. Because the bitlines are often relatively long and have some parasitic capacitance, reading the state of a memory cell is often done by precharging both bitlines BL and $\overline{BL}$ with a one or high value, asserting the word line WL thereby enabling transistors M5 and M6, and observing which bitline voltage drops relative to the other bitline such as by using a comparator or sense amplifier to speed up the read operation.

To write a value to the bitcell the value to be applied is written to the bit lines, such as writing a one value as bringing bitline BL to a one or high state and $\overline{BL}$ to a zero or low state. The word line WL is then asserted, and the value to be stored is latched into the bitcell. In a more detailed example, the bit line inputs are driven with a strong enough voltage signal to overcome the relatively weak transistors in the bitcell such that they can easily override the previous state of the bitcell's cross-coupled inverters. Because the inverters are cross-coupled, a slight change in state to one of the inverters (e.g. transistor pair M1 and M2) will help overwrite the state of the other pair of inverters. Access NMOS transistors M5 and M6 may be further designed to be stronger than the transistors M1, M2, M3, and M4, contributing to the speed of the write process.

Arrays of SRAM may be formed in a two-dimensional grid, with row and column decoders in peripheral circuitry selecting wordlines and bitlines associated with bitcells based on their memory address to access the bitcells. Bitcells are often accessed one word at a time, where a word may comprise a byte (or 8 bits), or another power of two such as 16, 32, or 64 bits. In other examples, memory operations may be conducted on words, single bits, pages of words, or other units of addressable memory to write and store information in the SRAM.

Some examples described herein demonstrate how SRAM memory storage cells may be allocated to efficiently store received interleaved data having variable length, such as compressed image data. By reducing the number of registers needed to track memory transaction streams and reducing the number of SRAM memory cells allocated but not used to store received data, the overall number of transistors or SRAM cells employed to perform such tasks is reduced, saving power and die space and improving overall performance.

Figure 7:
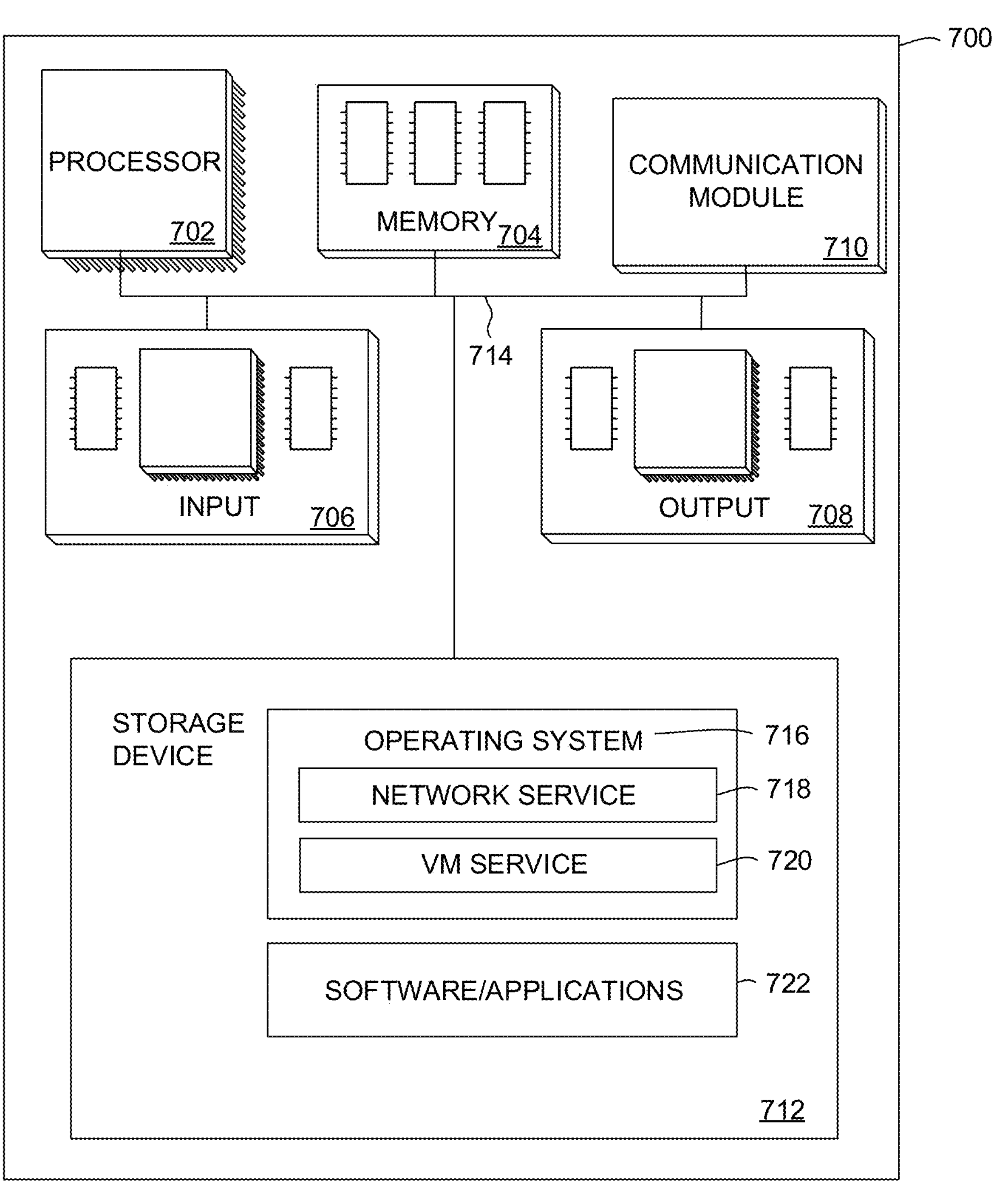
FIG. 7 shows a block diagram of a general-purpose computerized system, consistent with an example embodiment.

FIG. 7 shows a block diagram of a general-purpose computerized system, consistent with an example embodiment. FIG. 7 illustrates only one particular example of computing device 700, and other computing devices 700 may be used in other embodiments. Although computing device 700 is shown as a standalone computing device, computing device 700 may be any component or system that includes one or more processors or another suitable computing environment for executing software instructions in other examples, and need not include all of the elements shown here.

As shown in the specific example of FIG. 7, computing device 700 includes one or more processors 702, memory 704, one or more input devices 706, one or more output devices 708, one or more communication modules 710, and one or more storage devices 712. Computing device 700, in one example, further includes an operating system 716 executable by computing device 700. The operating system includes in various examples services such as a network service 718 and a virtual machine service 720 such as a virtual server. One or more applications 722 are also stored on storage device 712, and are executable by computing device 700.

Each of components 702, 704, 706, 708, 710, and 712 may be interconnected (physically, communicatively, and/or operatively) for inter-component communications, such as via one or more communications channels 714. In some examples, communication channels 714 include a system bus, network connection, inter-processor communication network, or any other channel for communicating data. Applications such as software application 722 and operating system 716 may also communicate information with one another as well as with other components in computing device 700.

Processors 702, in one example, are configured to implement functionality and/or process instructions for execution within computing device 700. For example, processors 702 may be capable of processing instructions stored in storage device 712 or memory 704. Examples of processors 702 include any one or more of a microprocessor, a controller, a central processing unit (CPU), a graphics processing unit (GPU), a neural processing unit (NPU), an image signal processor (ISP), a digital signal processor (DSP), an application specific integrated circuit (ASIC), a field-programmable gate array (FPGA), or similar discrete or integrated logic circuitry.

One or more storage devices 712 may be configured to store information within computing device 700 during operation. Storage device 712, in some examples, is known as a computer-readable storage medium. In some examples, storage device 712 comprises temporary memory, meaning that a primary purpose of storage device 712 is not long-term storage. Storage device 712 in some examples is a volatile memory, meaning that storage device 712 does not maintain stored contents when computing device 700 is turned off. In other examples, data is loaded from storage device 712 into memory 704 during operation. Examples of volatile memories include random access memories (RAM), dynamic random access memories (DRAM), static random access memories (SRAM), and other forms of volatile memories known in the art. In some examples, storage device 712 is used to store program instructions for execution by processors 702. Storage device 712 and memory 704, in various examples, are used by software or applications running on computing device 700 such as software application 722 to temporarily store information during program execution.

Storage device 712, in some examples, includes one or more computer-readable storage media that may be configured to store larger amounts of information than volatile memory. Storage device 712 may further be configured for long-term storage of information. In some examples, storage devices 712 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 700, in some examples, also includes one or more communication modules 710. Computing device 700 in one example uses communication module 710 to communicate with external devices via one or more networks, such as one or more wireless networks. Communication module 710 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 700 uses communication module 710 to wirelessly communicate with an external device such as via a public network.

Computing device 700 also includes in one example one or more input devices 706. Input device 706, in some examples, is configured to receive input from a user through tactile, audio, or video input. Examples of input device 706 include a touchscreen display, a mouse, a keyboard, a voice responsive system, video camera, microphone or any other type of device for detecting input from a user.

One or more output devices 708 may also be included in computing device 700. Output device 708, in some examples, is configured to provide output to a user using tactile, audio, or video stimuli. Output device 708, in one example, includes a display, a sound card, a video graphics adapter card, or any other type of device for converting a signal into an appropriate form understandable to humans or machines. Additional examples of output device 1008 include a speaker, a light-emitting diode (LED) display, a liquid crystal display (LCD or OLED), or any other type of device that can generate output to a user.

Computing device 700 may include operating system 716. Operating system 716, in some examples, controls the operation of components of computing device 700, and provides an interface from various applications such as software application 622 to components of computing device 700. For example, operating system 716, in one example, facilitates the communication of various applications such as software application 722 with processors 702, communication unit 710, storage device 712, input device 706, and output device 708. Applications such as image processor 722 may include program instructions and/or data that are executable by computing device 700. These and other program instructions or modules may include instructions that cause computing device 700 to perform one or more of the other operations and actions described in the examples presented herein.

Bitcell arrays, memory structures, memory instances, peripheral circuitry, and other circuits as described herein in particular examples may be formed in whole or in part by and/or expressed in transistors and/or lower metal interconnects (not shown) in processes (e.g., front end-of-line and/or back-end-of-line processes) such as processes to form complementary metal oxide semiconductor (CMOS) circuitry. The various blocks, neural networks, and other elements disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Storage media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

Features of example computing devices employed in example embodiments may comprise features, for example, of a client computing device and/or a server computing device. The term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU), image signal processor (ISP) and/or neural processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112(f) so that it is specifically intended that 35 USC § 112(f) not be implicated by use of the term "computing device," "processor," "processing unit," "processing circuit" and/or similar terms; however, if it is determined, for some reason not immediately apparent, that the foregoing understanding cannot stand and that 35 USC § 112(f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1 and 7 and in the text associated with the foregoing figure(s) of the present patent application.

The term electronic file and/or the term electronic document, as applied herein, refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format).

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example.

Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Although specific embodiments have been illustrated and described herein, any arrangement that achieve the same purpose, structure, or function may be substituted for the specific embodiments shown. This application is intended to cover any adaptations or variations of the example embodiments of the invention described herein. These and other embodiments are within the scope of the following claims and their equivalents.

What is claimed is:

1. A method comprising:

receiving a first series of memory access transactions from a first set of compressed data having a number of first transactions indeterminate in a transaction receiver;

receiving a second series of memory access transactions from a second set of compressed data having a number of second transactions indeterminate in the transaction receiver;

receiving a count representing outstanding transactions for a combination of first set of compressed data and the second set of compressed data in the transaction receiver; and allocating first memory space for the first series of transactions and the second series of transactions based at least in part on the received count representing outstanding transactions for the combination of the first set of compressed data and the second set of compressed data such that the first series of transactions are stored sequentially from a first end of the allocated first memory space and the second series of transactions are stored sequentially from a second end of the allocated first memory space opposite the first end.

2. The method of claim 1, wherein the first series of transaction stored sequentially from the first end are stored using consecutive memory transaction addresses counting in a first direction and the second series of transactions stored sequentially from the second end of the allocated first memory space are stored using consecutive memory transaction addresses counting opposite the first direction.

3. The method of claim 1, further comprising:

receiving a third series of memory access transactions from a third set of compressed data having a number of third transactions indeterminate in the transaction receiver;

receiving a fourth series of memory access transactions from a fourth set of compressed data having number of fourth transactions indeterminate in the transaction receiver;

receiving a count representing outstanding transactions for a combination of the third set of compressed data and the fourth set of compressed data or for a combination of the first set of compressed data, the second set of compressed data, the third set of compressed data, and the fourth set of compressed data in the transaction receiver; and allocating a second memory space for the third series of transaction and the fourth series of transactions based at least in part on the received count representing outstanding transactions for the combination of the third set of compressed data and the fourth set of compressed data such that the third series of transactions are stored sequentially from a first end of the allocated second memory space and the fourth series of transactions are stored sequentially from a second end of the allocated second memory space opposite the first end.

4. The method of claim 3, further comprising allocating a partition in memory between the allocated first memory space for the first series of transactions and the second series of transactions and the allocated second memory space for the third series of transactions and the fourth series of transactions.

5. The method of claim 1, wherein a header comprising a part of at least one of the first series of transactions or the second series of transactions indicates the number of outstanding transactions for the combination of the first set of compressed data and the second set of compressed data.

6. The method of claim 5, wherein the number of outstanding transactions for the first set of compressed data is not derived from the number of outstanding transactions for the second set of compressed data.

7. The method of claim 1, wherein each of the first set of transactions and the second set of transactions comprises a compression element comprising a portion of a compressed data set.

8. The method of claim 1, wherein the transaction receiver comprises a memory controller.

9. A device, comprising:

a memory transaction receiver circuit operable to:

receive a first series of memory access transactions from a first set of compressed data having a number of first transactions indeterminate in a transaction receiver;

receive a second series of memory access transactions from a second set of compressed data having a number of second transactions indeterminate in the transaction receiver; and receive a count representing outstanding transactions for a combination of the first set of compressed data and the second set of compressed data in the transaction receiver; and a memory allocation circuit operable to allocate a first memory space for the first series of transactions and the second series of transactions based at least in part on the received count representing outstanding transactions for the combination of the first set of compressed data and the second set of compressed data, and to store the first series of transactions sequentially from a first end of the allocated first memory space and to store the second series of transactions sequentially from a second end of the allocated first memory space opposite the first end.

10. The device of claim 9, wherein the first series of transaction stored sequentially from the first end are stored using consecutive memory transaction addresses counting in a first direction and the second series of transactions stored sequentially from the second end of the allocated first memory space are stored using consecutive memory transaction addresses counting opposite the first direction.

11. The device of claim 9, wherein:

the memory transaction receiver circuit is further operable to:

receive a third series of memory access transactions from a third set of compressed data having a number of third transactions indeterminate in the transaction receiver;

receive a fourth series of memory access transactions from a fourth set of compressed data having number of fourth transactions indeterminate in the transaction receiver; and receive a count representing outstanding transactions for a combination of the third set of compressed data and the fourth set of compressed data or for a combination of the first set of compressed data, the second set of compressed data, the third set of compressed data, and the fourth set of compressed data in the transaction receiver; and the memory allocation circuit is further operable to allocate a second memory space for the third series of transactions and the fourth series of transactions based at least in part on the received count representing outstanding transactions for the combination of the third set of compressed data and the fourth set of compressed data, and store the third series of transactions sequentially from a first end of the allocated second memory space and to store the fourth series of transactions sequentially from a second end of the allocated second memory space opposite the first end.

12. The device of claim 11, wherein the memory allocation circuit is further operable to allocate a partition in memory between the allocated first memory space for the first series of transactions and the second series of transactions and the allocated second memory space for the third series of transactions and the fourth series of transactions.

13. The device of claim 9, wherein the memory transaction receiver circuit is further operable to receive a header comprising a part of at least one of the first series of transactions or the second series of transactions that indicates the number of outstanding transactions for the combination of the first set of compressed data and the second set of compressed data.

14. The device of claim 9, wherein each of the first set of compressed data and the second set of transactions comprises a compression element comprising a portion of a compressed data set.

15. The device of claim 9, wherein the device comprises a memory controller.

16. An article comprising a non-transitory computer-readable medium to store computer-readable hardware description language code for fabrication of a device, the device comprising:

a memory transaction receiver circuit operable to:

receive a first series of memory access transactions from a first set of compressed data having a number of first transactions indeterminate in a transaction receiver;

receive a second series of memory access transactions from a second set of compressed data having a number of second transactions indeterminate in the transaction receiver; and receive a count representing outstanding transactions for a combination of the first set of compressed data and the second set of compressed data in the transaction receiver; and a memory allocation circuit operable to:

allocate a first memory space for the first series of transactions and the second series of transactions based at least in part on the received count representing outstanding transactions for the combination of the first set of compressed data and the second set of compressed data; and store the first series of transactions sequentially from a first end of the allocated first memory space and to store the second series of transactions sequentially from a second end of the allocated first memory space opposite the first end.

17. The article of claim 16, wherein the first series of transaction stored sequentially from the first end are stored using consecutive memory transaction addresses counting in a first direction and the second series of transactions stored sequentially from the second end of the allocated first memory space are stored using consecutive memory transaction addresses counting opposite the first direction.

18. The article of claim 16, the device further comprising:

memory transaction receiver circuitry further operable to:

receive a third series of memory access transactions from a third set of compressed data having a number of third transactions indeterminate in the transaction receiver;

receive a fourth series of memory access transactions from a fourth set of compressed data having number of fourth transactions indeterminate in the transaction receiver; and receive a count representing outstanding transactions for a combination of the third set of compressed data and the fourth set of compressed data or for a combination of the first set of compressed data, the second set of compressed data, the third set of compressed data, and the fourth set of compressed data in the transaction receiver, wherein memory allocation circuit is further operable to:

allocate a second memory space for the third series of transactions and the fourth series of transactions based at least in part on the received count representing outstanding transactions for the combination of the third set of compressed data and the fourth set of compressed data; and store the third series of transactions sequentially from a first end of the allocated second memory space and to store the fourth series of transactions sequentially from a second end of the allocated second memory space opposite the first end.

19. The article of claim 18, wherein the memory allocation circuit is further operable to allocate a partition in memory between the allocated first memory space for the first series of transactions and the second series of transactions and the allocated second memory space for the third series of transactions and the fourth series of transactions.

20. The article of claim 16, wherein the device comprises a memory controller.

* * * * *